United States Patent
Baldemair et al.

(10) Patent No.: US 11,375,478 B2
(45) Date of Patent: Jun. 28, 2022

(54) RESOURCE SIGNALING FOR PUCCH

(71) Applicant: Telefonaktiebolaget LM Ericsson (publ), Stockholm (SE)

(72) Inventors: Robert Baldemair, Solna (SE); Erik Dahlman, Stockholm (SE); Sorour Falahati, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/334,243

(22) PCT Filed: Feb. 13, 2017

(86) PCT No.: PCT/SE2017/050134
§ 371 (c)(1),
(2) Date: Mar. 18, 2019

(87) PCT Pub. No.: WO2018/147774
PCT Pub. Date: Aug. 16, 2018

(65) Prior Publication Data
US 2019/0230642 A1 Jul. 25, 2019

(51) Int. Cl.
H04W 72/04 (2009.01)
H04L 1/18 (2006.01)
(Continued)

(52) U.S. Cl.
CPC ....... *H04W 72/0406* (2013.01); *H04L 1/1607* (2013.01); *H04L 1/1614* (2013.01);
(Continued)

(58) Field of Classification Search
None
See application file for complete search history.

(56) References Cited

U.S. PATENT DOCUMENTS 10,135,513 B2 * 11/2018 Yi .................. H04L 1/0026
10,158,461 B2   12/2018 Li et al.
(Continued)

FOREIGN PATENT DOCUMENTS

CN   101969368 A   2/2011
CN   102098151 A   6/2011
(Continued)

OTHER PUBLICATIONS

International Search Report dated Sep. 1, 2017 for International Application No. PCT/SE2017/050134 filed on Feb. 13, 2017; Consisting of 4 pages.
3GPP TSG RAN WG1 Meeting #86bis R1-1608562; Title: Final Report of 3GPP TSG RAN WG1 #86 v1.0.0 (Gothenburg, Sweden, Aug. 22-26, 2016); Source: MCC Support; Document for: Approval; Location and Date Lisbon, Portugal, Oct. 10-14, 2016, consisting of 154-pages.
(Continued)

*Primary Examiner* — Jay P Patel
(74) *Attorney, Agent, or Firm* — Christopher & Weisberg, P.A.

(57) ABSTRACT

There is disclosed a User Equipment, UE, for a Radio Access Network. The UE is adapted for transmitting acknowledgement signaling pertaining to downlink data, the downlink data having one or more downlink data elements. The acknowledgement signaling has an uplink signaling format having one or more acknowledgement substructures, each of the substructures carrying acknowledgement information pertaining to a downlink data element. Each of the acknowledgment substructures is mapped to a different of the downlink data elements based on at least one acknowledgement position indication provided in downlink control signaling received by the UE. The disclosure also pertains to related devices and methods.

19 Claims, 10 Drawing Sheets

(51) Int. Cl.
  *H04L 5/00* (2006.01)
  *H04L 1/16* (2006.01)
(52) U.S. Cl.
  CPC .......... *H04L 1/1854* (2013.01); *H04L 1/1861* (2013.01); *H04L 5/0055* (2013.01); *H04W 72/0413* (2013.01); *H04L 5/0053* (2013.01); *H04L 5/0092* (2013.01)

(56) References Cited

U.S. PATENT DOCUMENTS

| | | | |
|---|---|---|---|
| 10,305,637 B2* | 5/2019 | Kim | H04L 1/1861 |
| 10,893,514 B2* | 1/2021 | Oizumi | H04W 72/00 |
| 2014/0307652 A1* | 10/2014 | Zhang | H04W 52/325 |
| | | | 370/329 |
| 2015/0085714 A1 | 3/2015 | Liang et al. | |
| 2015/0131579 A1* | 5/2015 | Li | H04L 1/08 |
| | | | 370/329 |
| 2016/0241377 A1* | 8/2016 | Takeda | H04L 5/0055 |
| 2016/0270006 A1 | 9/2016 | Choi et al. | |
| 2016/0270066 A1 | 9/2016 | Seo et al. | |
| 2016/0295574 A1* | 10/2016 | Papasakellariou | H04L 1/0073 |
| 2017/0019236 A1* | 1/2017 | Yang | H04L 1/1812 |
| 2017/0041123 A1* | 2/2017 | Yang | H04L 5/14 |
| 2017/0289981 A1 | 10/2017 | Kim et al. | |
| 2018/0176943 A1* | 6/2018 | Takeda | H04W 52/04 |
| 2018/0206224 A1* | 7/2018 | Hwang | H04L 27/26 |
| 2018/0242321 A1* | 8/2018 | Takeda | H04W 72/048 |
| 2018/0270011 A1* | 9/2018 | Yang | H04L 27/26 |
| 2019/0029032 A1* | 1/2019 | Yang | H04W 72/1284 |
| 2019/0036653 A1* | 1/2019 | Lunttila | H04L 1/1861 |
| 2019/0090258 A1* | 3/2019 | Ryu | H04B 7/0632 |
| 2019/0230685 A1* | 7/2019 | Park | H04W 72/0453 |
| 2019/0280820 A1 | 9/2019 | Kim et al. | |
| 2019/0356423 A1* | 11/2019 | Lee | H04L 5/0091 |
| 2020/0068560 A1* | 2/2020 | Song | H04L 1/1887 |

FOREIGN PATENT DOCUMENTS

| | | | |
|---|---|---|---|
| CN | 102223215 A | 10/2011 | |
| CN | 103026653 A | 4/2013 | |
| CN | 103493416 A | 1/2014 | |
| CN | 103918214 A | 7/2014 | |
| CN | 103026653 B | 5/2016 | |
| EP | 2654234 A2 * | 10/2013 | .......... H04L 1/1607 |
| EP | 2675096 A1 | 12/2013 | |
| JP | 2011061388 | 3/2011 | |
| JP | 2011061388 A | 3/2011 | |
| JP | 2014511057 A | 5/2014 | |
| RU | 2012151029 A | 10/2014 | |
| RU | 2536346 C2 | 12/2014 | |
| WO | 2009118285 A2 | 10/2009 | |
| WO | 2010090950 A1 | 8/2010 | |
| WO | 2014049918 A1 | 4/2014 | |
| WO | 2014148796 A1 | 9/2014 | |
| WO | 2016208727 A1 | 12/2016 | |
| WO | 2018127628 A1 | 7/2018 | |

OTHER PUBLICATIONS

Russian Office Action and Translation dated Mar. 16, 2020 for Application No. 2019128663; Consisting of 12-pages.
Intellectual Property Office of Singapore Written Opinion dated Nov. 12, 2020 for International Application No. 11201907021Y filed on Feb. 13, 2017, consisting of 6-pages.
Japanese Office Action and English Summary dated Oct. 30, 2020 for Japanese Application No. 2019543212, consisting of 5-pages.
3GPP TSG-RAN WG1 Meeting #70bis R1-124243; Title: Remaining issues on PUCCH resource allocation for EPDCCH; Source: Panasonic; Agenda Item: 7.5.7; Document for: Discussion and Decision; Date and Location Oct. 8-12, 2012, San Diego, USA, consisting of 7-pages.
Russian Decision to Grant and Machine Translation dated Sep. 28, 2020 for Application No. 2019128663/07 filed on Feb. 13, 2017, consisting of 28-pages.
Chinese Office Action with English Machine Translation dated Jul. 1, 2021 for Patent Application No. 201780086226.X, consisting of 43-pages.
3GPP TSG RAN WG2 Meeting #83 R2-132860; Title: Challenges in the uplink to support dual connectivity; Agenda Item: 7.2.1; Source: Intel Corporation; Document for: Discussion and Decision; Date and Location: Aug. 19-23, 2013, Barcelona, Spain, consisting of 7-pages.
Declaration of Dr. Zhi Ding for Inter Partes Review of U.S. Pat. No. 10,492,179 filed Feb. 25, 2021; *Samsung Electronics Co., Ltd.*, v. *Ericsson Inc. et al.*; Case IPR2021-00587, consisting of 150 pages.
Dismissal Prior to Institution of Trial dated Aug. 3, 2021; *Samsung Electronics Co., Ltd.*, v. *Telefonaktiebolaget LM Ericsson*; consisting of 13 pages.
Petition for Inter Partes Review of U.S. Pat. No. 10,492,179 filed Feb. 26, 2021; consisting of 94 pages.
3GPP TSG RAN WG1 Meeting #86is R1-1608808; Title: Discussion on subframe design with symbol level alignment; Agenda Item: 8.1.2.2; Source: Fujitsu; Document for: Discussion/Decision; Location and Date: Lisbon, Portugal Oct. 10-14, 2016, consisting of 5 pages.
3GPP TSG RAN WG1 Meeting #88 R1-1702983; Title: Resource Allocation for PUCCH; Agenda Item: 8.1.3.2.3; Source: Samsung; Document for: Discussion and Decision; Location and Date: Athens, Greece, Feb. 13-17, 2017, consisting of 3 pages.
3GPP TR 38.802 V1.0.0; 3rd Generation Partnership Project; Technical Specification Group Radio Access Network; Study on New Radio (NR) Access Technology Physical Layer Aspects (Release 14); Nov. 2016, consisting of 64 pages.
Chinese Office Action and English Summary dated Nov. 25, 2021 for Application No. 201780086226, consisting of 7 pages.
3GPP TSG-RAN WG1 Meeting #71 R1-125011; Title: Remaining issues on HARQ-ACK resource allocation for data scheduled via EPDDCCH: TDD aspects; Agenda item: 6.2.3.5; Source: Nokia Siemens Networks, Nokia; Document for: Discussion and Decision; Location and Date: New Orleans, LA, US, Nov. 12-16, 2012, consisting of 5 pages.

* cited by examiner

RESOURCE SIGNALING FOR PUCCH

CROSS-REFERENCE TO RELATED APPLICATIONS

This application is a Submission Under 35 U.S.C. § 371 for U.S. National Stage Patent Application of International Application Number: PCT/SE2017/050134, filed Feb. 13, 2017 entitled "RESOURCE SIGNALING FOR PUCCH," the entirety of which is incorporated herein by reference.

TECHNICAL FIELD

This disclosure pertains to wireless communication technology, in particular in the context of Radio Access Technology/Networks (RAT/RAN).

BACKGROUND

New wireless communication technologies, e.g. 5G technologies like 3GPP New Radio, are being developed and introduced for a wide range of use cases. To cover this wide range, more flexibility for signaling is desirable, in particular for control signaling.

SUMMARY

It is an object of the present disclosure to provide approaches allowing flexible transmission of uplink control signaling, respectively acknowledgement signaling. In the context of this disclosure, acknowledgement signaling may be considered a form of uplink control signaling, and/or be included and/or implemented therein, or be separately implemented. For example, uplink control signaling may comprise acknowledgement signaling next to for example scheduling grants and/or measurement reporting. Alternatively, acknowledgement signaling may be implemented to only comprise acknowledgement information, at per individual message.

Accordingly, there is disclosed a user equipment, UE, for a Radio Access Network. The UE is adapted for transmitting acknowledgement signaling pertaining to downlink data. The downlink data comprises one or more downlink data elements. The acknowledgement signaling has an uplink signaling format comprising one or more acknowledgement substructures, wherein each of the substructures carry acknowledgement information pertaining to a downlink data element. Further, each of the acknowledgment substructures is mapped to a different of the downlink data elements based on at least one acknowledgement position indication provided in downlink control signaling received by the UE. The UE may comprise processing circuitry and/or radio circuitry, in particular a transmitter or transceiver, and/or be adapted to use such, for transmitting acknowledgement signaling. Alternatively or additionally, the UE may comprise a transmitting module for such transmitting. It may be considered that the UE comprises a receiver, and/or a receiving module, for receiving downlink data and/or downlink control signaling, e.g. from a network node.

A method of operating a user Equipment, UE, in a Radio Access Network is also proposed. The method comprises transmitting acknowledgement signaling pertaining to downlink data, the downlink data comprising one or more downlink data elements.

The acknowledgement signaling has an uplink signaling format comprising one or more acknowledgement substructures, each of the substructures carrying acknowledgement information pertaining to a downlink data element. Further, each of the acknowledgment substructures is mapped to a different of the downlink data elements based on at least one acknowledgement position indication provided in downlink control signaling received by the UE. The method may comprise receiving downlink data and/or downlink control signaling, e.g. from a network node.

Moreover, a network node for a Radio Access Network may be considered. The network node is adapted for transmitting downlink control signaling comprising an acknowledgement position indication. The acknowledgement position indication indicates a mapping of at least one acknowledgement substructure of an uplink signaling format comprising one or more acknowledgement substructures to a corresponding data element of downlink data, wherein the acknowledgement substructure is mapped for carrying acknowledgement information pertaining to the downlink data element. The network node may comprise processing circuitry and/or radio circuitry, in particular a transmitter or transceiver, and/or be adapted to use such, for transmitting acknowledgement signaling. Alternatively or additionally, the network node may comprise a transmitting module for such transmitting.

In addition, there is described a method of operating a network node in a Radio Access Network. The method comprises transmitting downlink control signaling comprising an acknowledgement position indication. The acknowledgement position indication indicates a mapping of at least one acknowledgement substructure of an uplink signaling format comprising one or more acknowledgement substructures to a corresponding data element of downlink data, wherein the acknowledgement substructure is mapped for carrying acknowledgement information pertaining to the downlink data element.

Transmitting downlink control signaling may be transmitting to one or more than one UEs. It may generally be considered that transmitting downlink control signaling is an example and/or part of configuring the UE/s, in particular configuring on the physical layer and/or dynamic configuring.

Alternatively, there may be considered a network node for a RAN, the network node being adapted for receiving acknowledgement signaling having an uplink signaling format as discussed herein. The network node may in some variant be implemented as network node adapted for transmitting downlink control signaling as described herein. Independently, there may be considered a method of operating a network node in a RAN, the method comprising receiving acknowledgement signaling having an uplink signaling format as discussed herein. The method may comprise transmitting downlink control signaling as described herein, in particular before receiving, and/or for configuring, the acknowledgement signaling respectively the format. Receiving acknowledgement signaling may be based on a corresponding configuration, which may be known to the network node, which may determine it itself (for configuring the UE), and/or may have received corresponding information from another network node and/or the UE. The network node may comprise and/or utilise a receiver and/or a receiving module for such receiving.

The proposed approaches allow flexible signaling to a UE of which substructure, e.g. of a resource, for use for acknowledgement signaling. Thus, acknowledgement signaling may be adapted to a wide range of uses and situations, ensuring reliable information. It should be noted that in the context of this disclosure, a single acknowledgement substructure in an uplink signaling format mapped to one data element is considered to represent each of the acknowledgement substructures of the format being mapped to a different data element, if there is no mapping of the substructure to more than one data element (or vice versa).

The acknowledgment substructures may be transmitted in the same message and/or format and/or be jointly encoded and/or modulated and/or be transmitted on the same resource, which may be an uplink control signaling resource. Such a resource may be configured to the UE, e.g. in a resource pool. In particular, resource and/or resource pool may be pre-configured, e.g. before receiving the data elements and/or the downlink control signaling. The mapping described herein may generally be no considered to map data element/s to different substructures transmitted on the same resource.

Generally, the downlink control signaling and the downlink data may be transmitted on different channels, in particular different physical channels. Downlink signaling may be transmitted by a network node. Downlink control signaling may comprise downlink control information (DCI), and/or may be transmitted on a (ore more than one) shared or dedicated channel, e.g. a downlink control channel, for example a PDCCH (Physical Downlink Control CHannel), or a shared or broadcast channel. Downlink data may be transmitted on a (or more than one) shared or dedicated channel, e.g. a PDSCH (Physical Downlink Shared CHannel).

The downlink control signaling may comprise different message, e.g. different DCI messages, in particular received (by the UE) and/or transmitted (by the network node) in different time structures or TTIs.

Acknowledgement information may represent an acknowledgment or non-acknowledgement, e.g. of correct reception of the corresponding data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulation. Non-reception may indicate non-reception of a data element and/or non-reception of an acknowledgement position indication indicating a mapping pertaining to the data element. Non-reception may for example by indicated by a DTX (Discontinuous Transmission) indication.

The acknowledgement position indication may be selective between two or more different uplink signaling formats. A radio node may select, and/or be adapted to select, the acknowledgement position indication based on a suitable uplink signaling format. The uplink signaling formats may correspond to, and/or configured for, specific uplink resources. For example, for different configured (or scheduled) uplink resources, there may be used and/or associated different uplink signaling formats, for example depending on the size (in time-frequency space, e.g. represented by resource elements) of the resource/s.

It may be considered that the acknowledgment position indication indicates a timing and/or resource for transmitting the acknowledgement signaling. The timing may generally represent a time structure or interval used for transmission, e.g. a slot or mini-slot or shortened slot or similar, in particular a specific time structure or interval. Transmission may be intended within this time structure or interval, e.g. at the beginning or end, but not limited thereto. Such a time structure or interval or TTI may represent and/or comprise a plurality of symbols or resource elements (in time), respectively the associated time intervals, for example at least 2, at least 3, at least 4, at least 7 or at least 14 such time intervals, e.g. symbol time intervals. In general, the timing may be represented by a timing difference or time shift, e.g. between the timing of reception of the acknowledgement position indication and/or the data/data element/s it pertains to, and the intended or scheduled transmitting time structure, e.g. for transmitting the corresponding acknowledgement signaling. The time difference or time shift may me in some variants be represented by time value (e.g., in seconds or subunits thereof), or a time structure number, e.g. a difference in slot number between reception and transmission. Such a difference may for example be an integer number.

The downlink control signaling may comprise one or more messages, wherein each message may comprise at least one acknowledgement position indication. The message may for example be DCI messages. Different messages may pertain to different data elements and/or data provided on different downlink channels.

It may be considered that the acknowledgement position indication pertains to one downlink data element. Different acknowledgement position indications may pertain to different data elements, and/or may be included in different messages. However, in some variants, a message may comprise more than one acknowledgement position indication, and/or an acknowledgement position indication may pertain to more than one data element. In the latter case, there may be provided one-to-one mappings of data elements to substructures by the indication.

Generally, to each acknowledgement substructure there may be associated and/or mapped a single data element. It may be considered that the mapping between data elements and acknowledgement substructures is a one-to-one mapping.

The acknowledgement position indication may comprise a resource selection indication like a resource selection parameter. The resource selection indication may indicate a resource for transmitting the acknowledgement indication, the resource being selected from a number of possible resources configured for acknowledgement signaling and/or uplink control signaling, e.g. on a PUCCH. A resource selection parameter may for example be an ARI (ACK/NACK Resource Indicator). The resource may be a resource of a pool of resources configured recurrently for a plurality of time structures or intervals, e.g. slots and/or mini-slot or shortened slots, such that for each such structure or interval of this plurality, the resources are available (considering that they are shifted in time).

Alternatively or additionally, the acknowledgement position indication may comprise a timing indication like a timing parameter, the timing indication indicating a timing for transmitting the acknowledgement signaling, as well as indicating to which acknowledgement substructure of a resource a data element is mapped. The timing may be as discussed herein, in particular be represented by a difference in time structure or interval, e.g. difference in slot or mini-slot or shortened slot, in particular between the slot of reception, e.g. of the acknowledgement position indication and/or the data element/s, and the (intended or indicated or scheduled or configured) time structure or interval for transmitting. It should be noted that the data element/s and the corresponding acknowledgement position indication may be transmitted (respectively received) in the same time structure or interval, or in different time structures or intervals, depending on whether and/or how their respective channels are synchronized and/or timed. The timing indication may be referenced (e.g., by the UE and/or the network node) to either (if differently timed) or both (e.g., if simultaneous). The reference may be defined by the standard and/or implied and/or configured. A timing parameter may be represented by, and/or implemented as, a timing indicator.

Generally, a timing may represent a time interval like a slot or mini-slot or shortened slot for transmitting the acknowledgement signaling. A time structure or interval as referenced herein may in general be represented by a slot and/or mini-slot and/or shortened slot and/or be considered to represent a transmission time interval (TTI).

There is also disclosed a program product comprising instructions causing processing circuitry to perform and/or control any one method described herein.

Moreover, there is envisioned a carrier medium arrangement carrying and/or storing a program product as described herein.

An indication, in particular an acknowledgement position indication, may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. In particular, an acknowledgement position indication may comprise a resource selection indication (e.g., an ARI) having a bit pattern of one or more than one bits, and/or a timing indication (e.g., a timing indicator) having a bit pattern of one or more than one bits. These indications may be joined together, e.g. jointly encoded, to represent on position indication, or be transmitted separately. Such transmission may be in the same message, but with separate indications, e.g. according to a downlink control signaling format, which may be defined by a standard.

Signaling on a resource and/or resource structure associated to a specific channel may be considered to comprise and/or pertain to signals and/or symbols of the specific channel. For example, signaling on a PUCCH resource structure may comprise and/or pertain to signaling of and/or associated to PUCCH, whereas signaling on a PUSCH resource structure may comprise and/or pertain to signaling of and/or associated to PUCCH. Thus signaling on PUCCH or a related resource structure is different from signaling on a PUSCH.

Signaling may be according to a specific signaling format, in particular according to an uplink signaling format. A signaling format may generally define and/or determine a message structure and/or a bit structure or pattern. Such a structure or pattern may comprise a plurality of substructures. A substructure may comprise one or more bits. Different substructures may comprise different numbers of bits. However, in some variant each acknowledgement substructure of a signaling format may comprise the same number of bits. A substructure may be associated and/or mapped uniquely to a data element. A multi-bit (2 or more) substructure may for example be used for providing the possibility of indicating non-reception in addition to ACK/NACK, and/or for error-padding, and/or for improved or more detailed ARQ/HARQ signaling. A substructure carrying information may comprise one or more bits representing the information carried, e.g. ACK/NACK information.

Transmitting acknowledgement signaling may comprise encoding and/or modulating, e.g. the uplink signaling format and/or the substructures, and/or the corresponding information or bits. Encoding and/or modulating may comprise error detection coding and/or forward error correction encoding and/or scrambling. An uplink format may represent a bit structure comprising a plurality of bits, which may be structured according to one or more substructures, e.g. acknowledgement substructures. Jointly encoding and/or modulating may comprise encompassing the jointly encoded or modulated information or bits into the same coding, e.g. error coding (detection and/or error correction coding) and/or scrambling and/or modulating. Thus, jointly encoded information may be protected by the same bits of error coding, respectively subjected to the same modulation and/or scrambling event.

An acknowledgement position indication may generally be considered to indicate a position of the mapped substructure in the uplink signaling format, e.g. a number and/or range of bits, and/or in relation to other substructure/s. The information/bits in a substructure may generally indicate whether reception of the mapped/corresponding data element is acknowledged or not.

A resource may generally indicate time-frequency resource (or range/s in time-frequency space), in particular a resource structure, e.g. a resource structure comprising one or more resource elements. A resource may be part of a resource pool comprising a one or a plurality of resources, which may be configured (scheduled) for uplink transmission. Each resource may be possibly used for the acknowledgement signaling. Different resources may be different in size, e.g. range in frequency and/or time space. Different resources may be considered to pertain to, and/or be scheduled for, the same time structure/TTI, e.g., to the same slot or mini-slot or shortened slot. A resource pool may be configured for a plurality of time structures/TTIs. The resource pool may be configured by the network node, or more generally by the RAN. A resource and/or resource pool may be represented and/or configured according to a resource configuration, in particular an uplink control signaling configuration, which may in particular be a PUCCH configuration. A PUCCH configuration may represent resources for PUCCH signaling, in particular acknowledgement signaling on PUCCH.

It may be considered that to a resource there is associated one or more different uplink signaling formats, and/or that to different resources there are associated different uplink signaling formats. Different formats may differ in the number of acknowledgement substructures, and/or in the length (e.g., in bit) of the substructures. In some variants, a timing indication (in particular a timing indicator indicating a time shift) may have or represent an integer value in a range representing the number of different acknowledgement substructures in the uplink signaling format it pertains to. For example, if the format has 3 acknowledgement substructures, the indication may represent values between 0 and 2, or 1 and 3. A time shift may represent a shift in slots and be referred to as slot shift.

Generally, the UE may select, and/or be adapted for selecting, a resource for transmitting acknowledgement signaling based on a configuration, e.g. an uplink control signaling resource configuration, in particular a PUCCH configuration. The network node may be adapted for configuring the configuration, and/or configure the configuration. Such configuring may be on the RRC layer, e.g. via RRC signaling, and/or be considered statically, or semi-statically (e.g., being valid until changed by other RRC signaling, or covering a predefined plurality of timing structures and/or TTI), which may also be referred to a persistent or semi-persistent, respectively.

It may generally be considered that acknowledgement signaling comprises one uplink signaling format and/or one message with such a format, and/or that the acknowledgment signaling, respectively the format or message or the bits in the substructures, are jointly encoded and/or modulated for transmission, e.g. as part of transmitting.

Transmitting acknowledgement signaling may be based on, and/or comprise, determining acknowledgement information pertaining to the one or more data elements. Determining such information may comprise performing an ARQ and/or HARQ process and/or determining correct reception of the data elements (and/or considering non-reception). Alternatively or additionally, transmitting acknowledgement signaling may comprise and/or be based on receiving the downlink data, respectively the downlink data elements, for example based on a configuration, which may be a downlink data configuration. Such a configuration may be configured by the network node. The configuration may (statically and/or dynamically, e.g. in part both) may be valid for one or more than one time structure or TTI. However, in some cases, the configuration may be dynamically adapted for each time structure or TTI, e.g. as configured by a network node.

Acknowledgement signaling may be considered pertaining to downlink data if it comprises acknowledgement information pertaining to the downlink data respectively the data element/s thereof. Downlink data may generally represent data transmitted on a downlink channel, e.g. subject to one or more ARQ or HARQ processes. A data element may in particular represent a (e.g., a single) data block (transport block), which may be associated to a specific ARQ/HARQ process. In particular, different data elements may be associated to different ARQ/HARQ processes (which may run in parallel).

Data elements of the data may be transmitted by the network node, and/or under control or monitoring by the network node, which may be adapted accordingly, and/or utilise its circuitry accordingly, and/or comprise a data transmitting module therefor. Generally, data elements may be associated to one or more different transmissions/transmission events and/or messages, in particular to transmissions at different times or different time structures or intervals, e.g. TTIs. The approaches described herein allow flexible acknowledgement/HARQ feedback for data elements received in different time structures/TTI. A UE may receive, and/or be adapted to receive and/or to utilise its circuitry to receive, the downlink data and/or the data elements, e.g. based on a configuration.

Transmitting the acknowledgment signaling may be in or on a resource, which may be indicated by the acknowledgment position indication, in particular a resource selection indication.

PUCCH and/or a downlink control channel may be implemented as defined according to a 3GPP standard, in particular according to LTE or NR, as amended as suggested herein.

A PUCCH may generally be a physical channel for transmitting uplink control signaling, e.g. UCI and/or HARQ signaling and/or measurement reports and/or scheduling requests.

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or relay node and/or micro/nano/pico/femto node and/or other node, in particular for a RAN as described herein.

The terms user equipment (UE) and terminal may be considered to be interchangeable in the context of this disclosure. A user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (which may operate as transmitter and receiver), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

BRIEF DESCRIPTION OF THE DRAWINGS

The drawings are provided to illustrate concepts and approaches described herein, and are not intended to limit their scope. The drawings comprise:

FIG. 7, showing an exemplary method of operating a terminal or UE;

FIG. 9, showing an exemplary method of operating a network node; and

DETAILED DESCRIPTION

Figure 1:
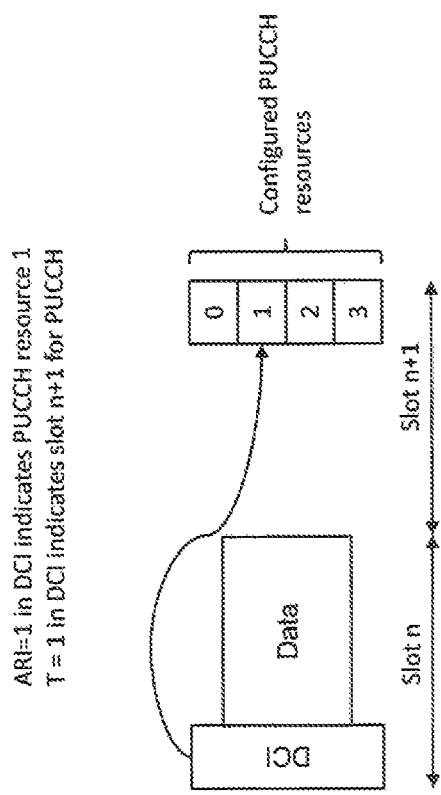
FIG. 1, showing exemplary mapping of signaling to PUCCH resources.

In the following, reference is made to LTE technology, for illustration and comparison. However, the approaches described are not limited thereto, and may be applied to analogous devices, structures and channels e.g. in the context of NR:

In FIG. 1, DL transmission is shown where a DL transmission is scheduled in slot n and the HARQ feedback is requested in slot n+1. The UE may be configured accordingly, e.g. via the corresponding DCI, which may comprise a corresponding timing indicator.

In addition to the timing, the UE also needs to know the exact PUCCH resource to be used within slot n+1. In LTE—depending on PUCCH format—implicit and explicit signaling is used. For PUCCH Format 1a/1b and 2/2a/2b, implicit signaling is used, wherein the PUCCH resource is derived from the position of the scheduling PDCCH CCE (in addition to RRC configured parameters). For other PUCCH formats, a pool of PUCCH resources is configured, and an ACK/NACK Resource Indicator (ARI) is used to dynamically select one of the configured resources.

Given the anticipated much higher flexibility of PUCCH reporting in NR, it is questionable if mainly relying on implicit signaling becomes not very complicated and maybe inefficient: For example, if for two DL transmissions in different slots HARQ feedback should be reported in the same slot they would use the same PUCCH resource if scheduled from the same PDCCH position (assuming a similar rule as in LTE). To avoid such a collision, another PDCCH resource would have to be used which restricts control channel scheduling. It may be considered to configure, e.g. via RRC signaling, a pool of PUCCH resources and dynamically select which PUCCH resource to use. One possibility for this dynamic indication is the ACK/NACK Resource Indicator (ARI) included in the DCI.

Figure 2:
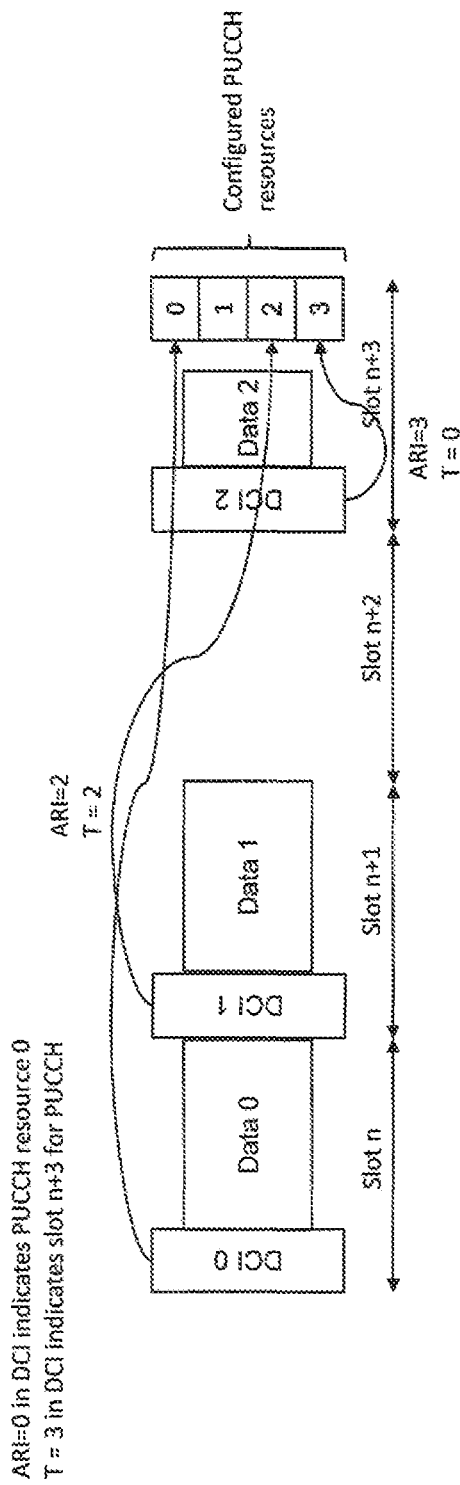
FIG. 2, showing another exemplary mapping of signaling to PUCCH resources.

In FIG. 2, another scheduling example is shown where a UE is scheduled in subsequent slots with DL transmissions. Due to lack of PUCCH opportunities (e.g. no UL opportunities), HARQ feedback for all shown transmissions is requested in slot n+3. In particular, FIG. 2 shows a scenario in which a device (UE) is scheduled multiple times (for downlink data) and should send HARQ feedback for all transmissions in slot n+3. The ACK/NACK timing indicator included in the DCIs points for all transmissions to slot n+3. The ARIs included in the DCIs point to different PUCCH resources to avoid collisions.

While this works in principle, it may not be the most efficient solution. In the example shown in FIG. 2, the UE would have to transmit three independent PUCCH in subframe n+3, e.g. different messages. This is sub-optimum from many perspectives: One jointly coded transmissions with 3 bits (assuming for simplicity each HARQ feedback consists of a single bit) can be more efficient than 3 individual transmissions; some of the NR PUCCH formats will be of low PAPR which will be lost if multiple PUCCH are transmitted simultaneously; depending on the frequency positions of the PUCCH resources power back-offs might be required due to intermodulation products.

Figure 3:
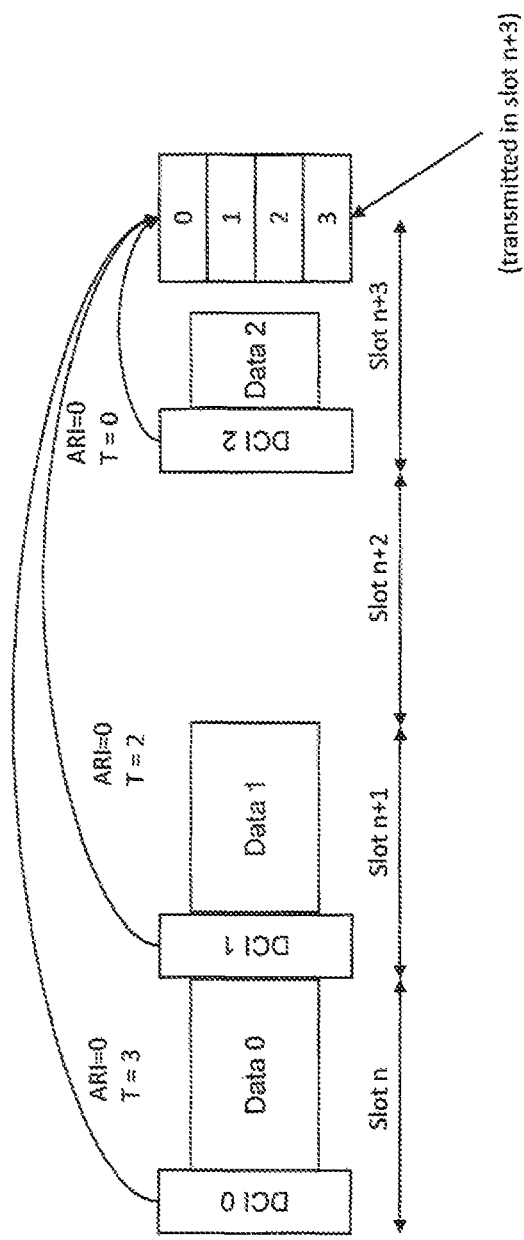
FIG. 3, showing another exemplary mapping of signaling to PUCCH resources.

It may be considered to allow requesting HARQ feedback from DL transmissions from different slots in one PUCCH transmissions, as shown FIG. 3. All ARI in the received DC's point to the same PUCCH resource (0 in this example). The PUCCH format must be capable to carry multiple bits in different substructures. Accordingly, HARQ feedback of multiple DL transmissions is transmitted on a single PUCCH transmission/message, respectively is jointly encoded/modulated (PUCCH is completely transmitted in slot n+3).

If the UE misses a DL assignment (configuration), it is not aware it should report HARQ feedback and does not send an ACK or NACK. Assuming the UE misses the assignment in slot n and receives the assignments in slots n+1 and n+3. The UE therefore sends only two feedback bits, one for slot n+1 and one for slot n+3. However, the gNB expects three bits (one bit for each scheduled slot n, n+1, and n+3). If it only receives one or two bits it does not know to which DL transmissions the feedback corresponds to. Only if three bits feedback or no feedback at all is received the situation is clear.

Thus, in a variant, the ACK/NACK timing indicators (T in the figures) contained in the DCIs are used 1) for indicating in which slot the feedback should be transmitted in, and 2) for indicating, or as a pointer to a substructure within the PUCCH resource (respectively the associated uplink signaling format) indicated by ARI with which subresource/substructure (e.g. bit in a bitmap) the feedback should be transmitted.

The error case outlined above thus is avoided. Even if UE misses some assignments (configurations or scheduled data), it is always clear to which DL transmission a received a HARQ feedback corresponds to. This reduces required re-transmissions and by that improves throughput. Accordingly, HARQ feedback reporting according to the proposed solution (PUCCH resource 0 is completely transmitted in slot n+3).

The ACK/NACK timing indicator T indicates in which slot the HARQ feedback of the corresponding DL transmission should be sent. In the example, all DL transmissions should be acknowledged in slot n+3. The T value is different in the different slots since it is relative to the slot in which the DL data is received (in another variant it could be relative to the slot in which the DCI is received in).

Herein, it is assumed that the ACK/NACK timing indicator is received in the DCI, other possibilities can be envisioned too, e.g. the ACK/NACK timing indicator is derived from the slot or symbol number. Furthermore, in this example, all DCI contain an ARI value of 0. From the ACK/NACK timing indicator T and the ARI the UE knows it should use PUCCH resource 0 in slot n+3. The PUCCH resource indicated by ARI must be a multi-bit resource, in the shown example PUCCH resource 0 can carry four HARQ feedback bits (each in an associated bit field, representing a substructure).

From the ACK/NACK timing indicator T the UE knows it should send HARQ feedback of DL transmission received in slot n in bit field 3, HARQ feedback of DL transmission received in slot n+1 in bit field 2, and HARQ feedback of DL transmission received in slot n+3 in bit field 0. The not used bit position 1 would be set to fixed value by the UE, e.g. a NACK. Even if the UE is scheduled but it does not receive the scheduling assignment (which the UE cannot distinguish from not being scheduled) it would set the corresponding bit position to the same fixed value.

An extension would be that the UE sets a bit position corresponding to a not received transmission not to NACK but to DTX (which indicates it did not receive an assignment); in this way the gNB could distinguish between a received but failed to decode transmission and a transmission the UE did not even receive. However, in this case the feedback is larger since each bit position can assume the values ACK, NACK, and DTX. In the simplest case each "bit" position would be represented by 2 bits; in a preferred way however the space of all 4 resources would be jointly considered: In above example, there may be 4 positions, and each position can assume 3 values, in total $3^4=81$ combinations requiring in total ceil*log 2(81)=7 bits.

In this example, the ACK/NACK timing indicator points directly to the bit in the bit field (or more generally PUCCH sub-resource within the PUCCH resource indicated by ARI). More generally, the index to the PUCCH sub-resource is a function $f(T)$ of the received ACK/NACK timing indicator.

In this example, it is assumed that each DL transmission is acknowledged with a single bit HARQ feedback. However, this can easily be extended where each DL transmission (data element) is acknowledged by multi-bit feedback (e.g. multiple bits for MIMO; if a DL transmission (transport block) is segmented into multiple code blocks and each code block or group of code blocks can be acknowledged individually with a bit; soft feedback where multiple bits indicate the degree how successful the decoding was ranging from ACK to almost ACK . . . to NACK). Multi-bit feedback could easily be combined with above mentioned DTX indication.

On a first glance one could expect that there is a performance loss since the PUCCH resource carries four bits, but only three bits feedback are needed in the example (since three transmissions were scheduled/configured). However, the gNB knows which PUCCH sub-resources contain ACK/NACK (or possible DTX) (positions 0, 2, 3) and knows a fixed value will be signaled on position 1. The gNB can consider this in decoding and by that in practice only decode for 3 bits with small or no performance loss.

Figure 4:
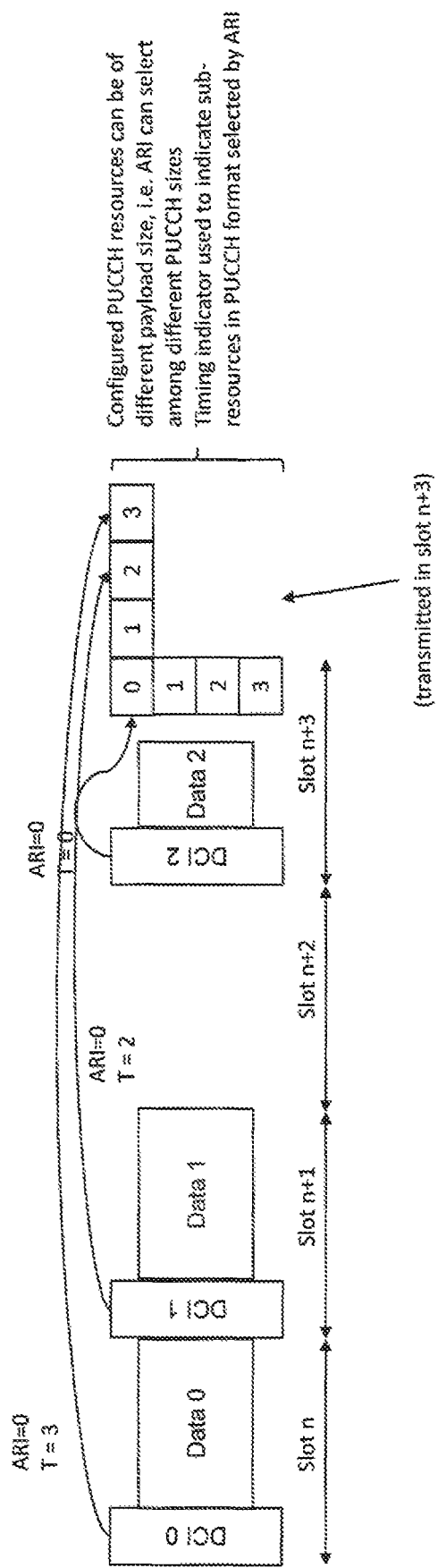
FIG. 4, showing another exemplary mapping of signaling to PUCCH resources.

Generally, the ARI may be considered to select among or between resources in a configured pool of PUCCH resources (e.g. all PUCCH resources are of the same format or carry the same payload size). This concept may be extended such that ARI can point to select between configured PUCCH resources of different format or payload: In the example in FIG. 4, PUCCH resource 0 is capable to carry 4 bits, while PUCCH resources 1 to 3 can carry only 1 bit each.

In the description a separate ARI field and ACK/NACK timing indication is used to represent an acknowledgement position indication. However, it may be considered that acknowledgement position indication may be represented by one indication, e.g. jointly encoded information, such that for example both ARI and ACK/NACK timing indicator can be derived therefrom.

In general, it may be considered that the ACK/NACK timing indicator is reused to select a PUCCH sub-resource within the PUCCH resource pointed out by ACK/NACK resource indicator (ARI). The concept of ARI may be extended so that ARI can select within a pool of configured PUCCH resources which are not equal (i.e. either differ in format type or supported payload).

Figure 5:
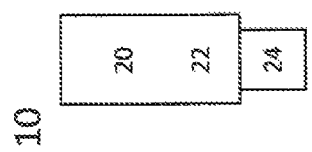
FIG. 5, showing an exemplary terminal or UE.

FIG. 5 schematically shows a terminal 10, which may be implemented as a UE (User Equipment). Terminal 10 comprises processing circuitry (which may also be referred to as control circuitry) 20, which may comprise a controller connected to a memory. Any module of the terminal, e.g. a transmitting module or receiving module, may be implemented in and/or executable by the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the control circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal may generally be adapted to carry out any of the methods for operating a terminal or UE disclosed herein; in particular, it may comprise corresponding circuitry, e.g. processing circuitry, and/or modules.

Figure 6:
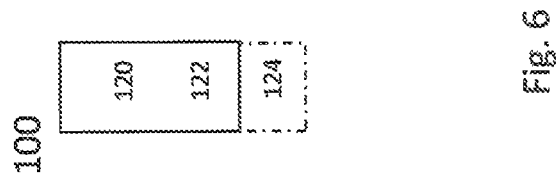
FIG. 6, showing an exemplary network node.

FIG. 6 schematically show a network node 100, which in particular may be an eNB, or gNB or similar for NR. Network node 100 comprises processing circuitry (which may also be referred to as control circuitry) 120, which may comprise a controller connected to a memory. Any module, e.g. transmitting module and/or receiving module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

FIG. 7 shows a diagram for an exemplary method of operating a terminal or user equipment. The method comprises an action TS10 of transmitting acknowledgement signaling pertaining to downlink data, the downlink data comprising one or more downlink data elements; wherein transmitting acknowledgement signaling is performed as described herein.

Figure 8:
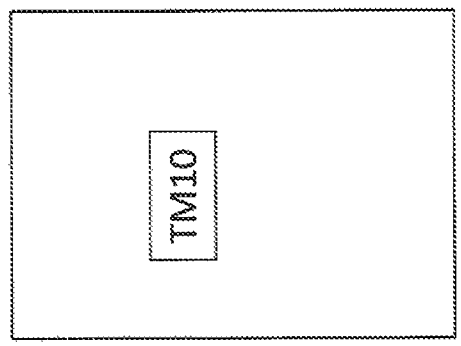
FIG. 8, showing an exemplary terminal or UE.

FIG. 8 shows a schematic of an exemplary terminal or user equipment. The user equipment may comprise a transmitting module TM10 for performing action TS10.

FIG. 9 shows a diagram for an exemplary method of operating a network node. The method comprises an action NS10 of transmitting downlink control signaling comprising an acknowledgement position indication as described herein.

Figure 10:
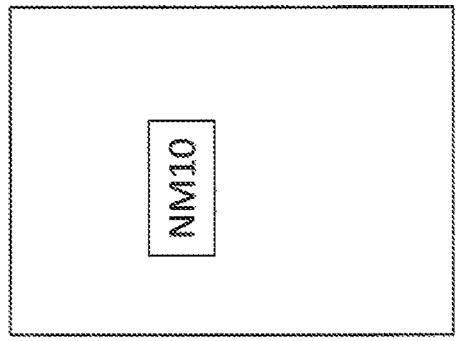
FIG. 10, showing an exemplary network node.

FIG. 10 shows a schematic of an exemplary network node. The network node may comprise a transmitting module NM10 for performing action NS10.

In the context of this disclosure, HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK//NACK information or feedback (or shorter HARQ-ACK information or feedback or HARQ information or feedback or just HARQ) may include transmitting a signal/bit indicating whether a transport block of data received by the terminal has been receiver correctly or not. HARQ and/or determining HARQ may include decoding and/or error detection procedures to determine correct reception. There may be defined a number of HARQ processes with associated HARQ ids or numbers, which may refer to individual data streams and/or associated data elements; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier, e.g. dependent on the rank used. Generally, HARQ feedback may be transmitted (and/or determined, e.g. based on received signals and/or transport blocks and/or data and/or HARQ process identifiers) by a terminal, and/or a terminal may be adapted for, and/or comprise a HARQ module for, determining (e.g., as mentioned above) and/or transmitting HARQ feedback, in particular based on and/or using a configuration and/or a modulation configured, e.g. a modulation determined and/or configured as described herein. Transmitting HARQ may generally be performed on a UL control channel, e.g. PUCCH.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE.

A resource generally may represent a time-frequency resource, on which signaling according to a specific format may be transmitted and/or be intended for transmission. The format may comprise one or more substructures, which may be considered to represent a corresponding sub-resource (as they would be transmitted in a part of the resource).

The term transmission time interval (TTI) may correspond to any time period (T0) over which a physical channel can be encoded and optionally interleaved for transmission. The physical channel may be decoded by the receiver over the same time period (T0) over which it was encoded. Examples of TTI comprise short TTI (sTTI), transmission time, slot, sub-slot, mini-slot, mini-subframe etc. A TTI may comprise a one or more symbol time intervals, and/or one or two slot time intervals, wherein e.g. 7 symbol time intervals may correspond to a slot time interval. Time interval-related terms may be considered to follow 3GPP nomenclature. A mini-slot or shortened slot or short TTI may correspond to a plurality of symbol time intervals, e.g. 2 or 3 or 4 or 5 or 6 or 7 symbol time intervals.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node. A network node may utilise, and/or be adapted to utilise, its circuitry/ies for configuring.

Generally, configuring may include determining configuration data representing the configuration and providing it to one or more other nodes (parallel and/or sequentially), which may transmit it further to the radio node (or another node, which may be repeated until it reaches the wireless device). Alternatively or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR.

Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:

| Abbreviation | Explanation |
| --- | --- |
| ACK | Acknowledgment |
| ARI | ACK/NACK Resource Indicator |
| CCE | Control Channel Element |
| DCI | Downlink Control Information |
| DL | Downlink |
| DTX | Discontinues Transmission |
| HARQ | Hybrid Automatic Repeat Request |
| MIMO | Multiple Input Multiple Output |
| NACK | Negative Acknowledgment |
| PAPR | Peak to Average Power Ratio |
| PDCCH | Physical Downlink Control Channel |
| PUCCH | Physical Uplink Control Channel |
| RRC | Radio Resource Control |
| UL | Uplink |

The invention claimed is:

1. A user equipment, UE, for a Radio Access Network, the UE being configured to:
transmit acknowledgement signaling pertaining to downlink data, the downlink data comprising at least one downlink data element, the acknowledgement signaling having an uplink signaling format comprising at least one acknowledgement substructure, each of the at least one acknowledgement substructure carrying acknowledgement information pertaining to a corresponding downlink data element, and each of the at least one acknowledgment substructure being mapped to the corresponding downlink data element based on at least one acknowledgement position indication provided in downlink control signaling received by the UE, the acknowledgement position indication comprised in the downlink control signaling comprising a resource selection indication, the resource selection indication comprising at least one bit explicitly indicating a physical uplink control channel, PUCCH, resource for transmitting the acknowledgement signaling pertaining to the downlink data, the PUCCH resource being selected explicitly by the at least one bit from a pool of PUCCH resources configured to the UE to be available for transmitting the acknowledgement signaling, the pool of PUCCH resources configured to the UE comprising PUCCH resources having different PUCCH formats.

2. A network node for a Radio Access Network, the network node configured to:
transmit downlink control signaling comprising an acknowledgement position indication, the acknowledgement position indication indicating a mapping of at least one acknowledgement substructure of an uplink signaling format comprising at least one acknowledgement substructure to a corresponding downlink data element, each of the at least one acknowledgement substructure being mapped for carrying acknowledgement information pertaining to the corresponding downlink data element based on the acknowledgement position indication, the acknowledgement position indication comprised in the downlink control signaling comprising a resource selection indication, the resource selection indication comprising at least one bit explicitly indicating a physical uplink control channel, PUCCH, resource for transmitting the acknowledgement signaling pertaining to the downlink data, the PUCCH resource being selected explicitly by the at least one bit from a pool of PUCCH resources configured to the UE to be available for transmitting the acknowledgement signaling, the pool of PUCCH resources configured to the UE comprising PUCCH resources having different PUCCH formats.

3. A method of operating a user equipment, UE, in a Radio Access Network, the method comprising:
transmitting acknowledgement signaling pertaining to downlink data, the downlink data comprising at least one downlink data element, the acknowledgement signaling having an uplink signaling format comprising at least one acknowledgement substructure, each of the at least one acknowledgement substructure carrying acknowledgement information pertaining to a corresponding downlink data element, and each of the at least one acknowledgment substructure being mapped to the corresponding downlink data element based on at least one acknowledgement position indication provided in downlink control signaling received by the UE, the acknowledgement position indication comprised in the downlink control signaling comprising a resource selection indication, the resource selection indication comprising at least one bit explicitly indicating a physical uplink control channel, PUCCH, resource for transmitting the acknowledgement signaling pertaining to the downlink data, the PUCCH resource being selected explicitly by the at least one bit from a pool of PUCCH resources configured to the UE to be available for transmitting the acknowledgement signaling, the pool of PUCCH resources configured to the UE comprising PUCCH resources having different PUCCH formats.

4. A method of operating a network node in a Radio Access Network, the method comprising:
transmitting downlink control signaling comprising an acknowledgement position indication, the acknowledgement position indication indicating a mapping of at least one acknowledgement substructure of an uplink signaling format comprising at least one acknowledgement substructure to a corresponding downlink data element, each of the at least one acknowledgement substructure being mapped for carrying acknowledgement information pertaining to the corresponding downlink data element based on the acknowledgement position indication, the acknowledgement position indication comprised in the downlink control signaling comprising a resource selection indication, the resource selection indication comprising at least one bit explicitly indicating a physical uplink control channel, PUCCH, resource for transmitting the acknowledgement signaling pertaining to the downlink data, the PUCCH resource being selected explicitly by the at least one bit from a pool of PUCCH resources configured to the UE to be available for transmitting the acknowledgement signaling, the pool of PUCCH resources configured to the UE comprising PUCCH resources having different PUCCH formats.

5. The method according to claim 3, wherein the downlink control signaling and the downlink data are transmitted on different physical channels.

6. The method according to claim 3, wherein the acknowledgement information represents one of an acknowledgment and non-acknowledgement of correct reception of the corresponding data element.

7. The method according to claim 3, wherein the acknowledgement position indication is selective between at least two different uplink signaling formats.

8. The method according to claim 3, wherein the acknowledgment position indication indicates at least one of a timing and a resource for transmitting the acknowledgement signaling.

9. The method according to claim 3, wherein the downlink control signaling comprises at least one message, wherein each message includes at least one acknowledgement position indication.

10. The method according to claim 3, wherein the acknowledgment position indication pertains to one downlink data element.

11. The method according to claim 3, wherein the acknowledgement position indication comprises a timing indication like a timing parameter, the timing indication indicating a timing for transmitting the acknowledgement signaling, as well as indicating to which acknowledgement substructure of a resource a data element is mapped.

12. The method according to claim 3, wherein a timing represents a time interval for transmitting the acknowledgement signaling.

13. A non-transitory computer storage medium storing executable instructions that, when executed, cause processing circuitry to at least one of perform control a method of operating a user equipment, UE, in a Radio Access Network, the method comprising:
transmitting acknowledgement signaling pertaining to downlink data, the downlink data comprising at least one downlink data element, the acknowledgement signaling having an uplink signaling format comprising at least one acknowledgement substructure, each of the at least one acknowledgement substructure carrying acknowledgement information pertaining to a corresponding downlink data element, and each of the at least one acknowledgment substructure being mapped to the corresponding downlink data element based on at least one acknowledgement position indication provided in downlink control signaling received by the UE, the acknowledgement position indication comprised in the downlink control signaling comprising a resource selection indication, the resource selection indication comprising at least one bit explicitly indicating a physical uplink control channel, PUCCH, resource for transmitting the acknowledgement signaling pertaining to the downlink data, the PUCCH resource being selected explicitly by the at least one bit from a pool of PUCCH resources configured to the UE to be available for transmitting the acknowledgement signaling, the pool of PUCCH resources configured to the UE comprising PUCCH resources having different PUCCH formats.

14. The method according to claim 3, wherein the resource selection indication is a resource selection parameter.

15. The method according to claim 3, wherein the acknowledgement information represents an indication of non-reception.

16. The method according to claim 4, wherein the downlink control signaling and the downlink data are transmitted on different physical channels.

17. The method according to claim 4, wherein acknowledgement information represents one of an acknowledgment and non-acknowledgement of correct reception of the corresponding data element.

18. The method according to claim 4, wherein the acknowledgement position indication is selective between at least two different uplink signaling formats.

19. The method according to claim 4, wherein the acknowledgment position indication indicates at least one of a timing and a resource for transmitting the acknowledgement signaling.

* * * * *